Nov. 21, 1961   W. F. LASER   3,009,717
LABYRINTH SEAL INCLUDING BACK UP SPRING
Filed Jan. 8, 1958
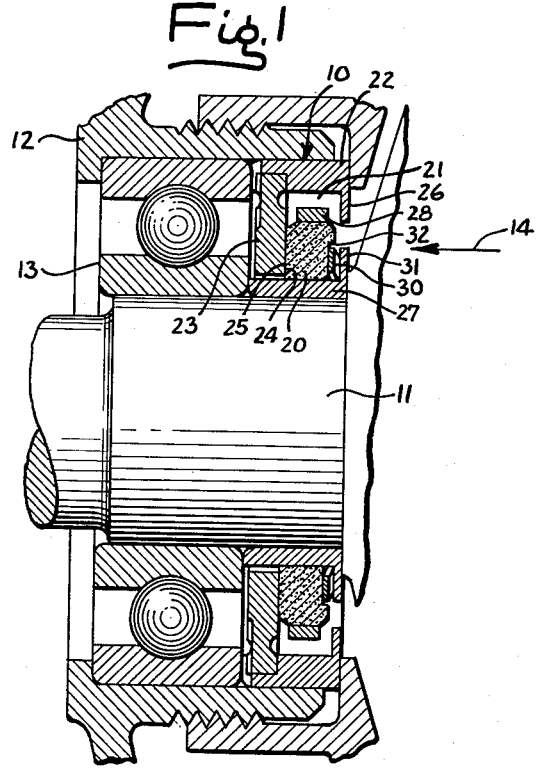
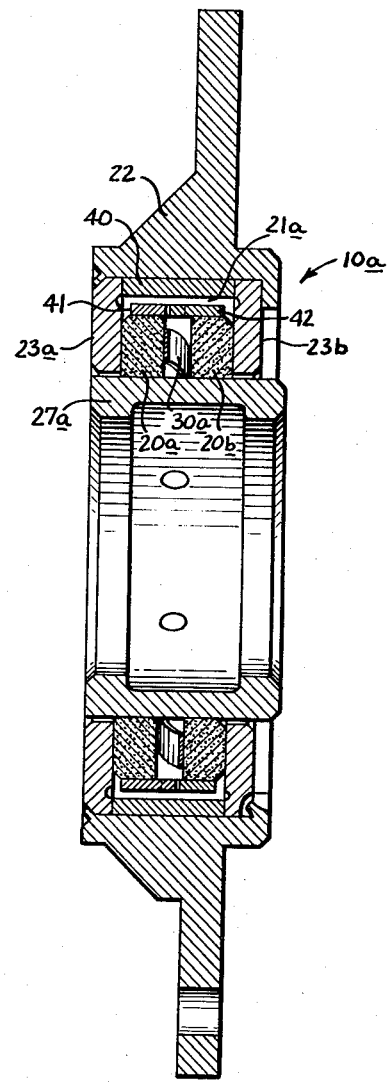
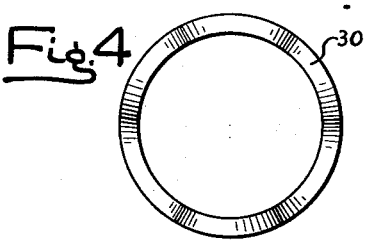
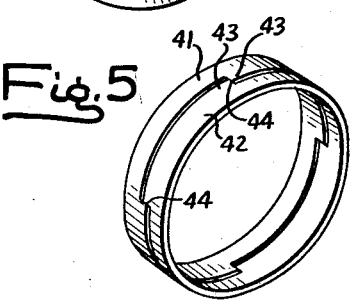
INVENTOR
WILLIAM F. LASER
by: Carlson, Pitzner, Hubbard & Wolfe
ATTYS.

United States Patent Office 3,009,717
Patented Nov. 21, 1961

3,009,717
LABYRINTH SEAL INCLUDING BACK UP SPRING
William F. Laser, Evanston, Ill., assignor to City National Bank and Trust Company of Chicago, as trustee under the Cartridge Type Seal Liquidation Trust
Filed Jan. 8, 1958, Ser. No. 707,750
2 Claims. (Cl. 286—11.15)

This invention relates generally to rotary seals and more particularly to a floating labyrinth-type rotary seal that will effectively seal under static conditions, as well as at high speeds and extreme temperatures.

The type of floating mechanical labyrinth seal toward which the present invention is particularly, although not exclusively, directed forms the subject matter of applicant's co-pending application Serial No. 508,029, filed May 13, 1955, now Patent No. 2,917,329 of December 15, 1959, of which the present application is a continuation in part. As set forth in this application, a seal of this type depends upon the high temperatures and high speeds of rotation at which it is designed to operate for creating a positive seal. Under static conditions, that is, when the rotatable shaft on which the seal is mounted is at rest and at normal temperatures, the parts of the seal fit loosely, with the rotor being free to slide away from the stator so that considerable gas leakage may occur.

Seals of this type are extensively utilized in gas turbines because of their exceptional ability to operate at high speeds and extreme temperatures, but it has been found that since they do not provide a good seal under static conditions, their effectiveness is compromised. For example, when a turbine is started up, hot gases tend to escape through the seal before its parts reach their normal operating speeds and temperatures. This initial leakage of hot gas tends to cause premature failure of the adjacent bearings.

Therefore, it is an object of the invention to provide a floating mechanical labyrinth rotary seal that not only is effective to provide a positive seal at extreme temperatures and high speeds of rotation but which also provides an effective seal under static and start-off conditions.

It is a related object to provide a seal as described above which does not utilize O-rings or similar elements made of organic materials in order to achieve effective sealing under either static or operating conditions, so that the seal structure can withstand extremely high temperatures.

With more particularity, it is an object to provide a rotary seal as characterized above in which the rotor and stator are positively urged into sealing contact under static conditions when these parts are not moving relatively, but in which the rotor and stator do not rub against one another when the seal is operating at normal high temperatures. Thus, the seal is effective under static conditions, but is not subject to wear when operating at extremely high speeds.

It is another object to provide a seal of the above type which is exceptionally reliable and quite simple in design so that the seal is economical to both manufacture and operate.

Other objects and advantages of the invention will become apparent upon reading the attached detailed description and upon reference to the drawings in which:

FIGURE 1 is a longitudinal, sectional view of a seal constructed in accordance with the present invention.

FIG. 2 is a longitudinal, sectional view of a modified type of seal embodying the present invention.

FIG. 3 is an edge view of a wave spring utilized in the seal shown in FIGS. 1 and 2.

FIG. 4 is a plan view of the spring illustrated in FIG. 3.

FIG. 5 is a perspective view of the retaining ring arrangement utilized in the seal shown in FIG. 2.

While the invention will be described in connection with certain preferred embodiments, it will be understood that I do not intend to limit the invention to those embodiments. On the contrary, I intend to cover all alternatives, modifications and equivalents as may be included within the sphere and scope of the invention as defined by the appended claims.

Turning first to FIG. 1, there is shown a seal 10 constructed in acordance with the present invention and adapted to prevent gas leakage through the housing 12 along the rotatable shaft 11. In the illustrated embodiment, a bearing 13 is provided to rotatably mount the shaft 11 in the housing 12. The direction of gas pressure is indicated by the arrow 14.

In keeping with the invention, the seal 10 includes a rotor 20 slidably fitted on the shaft 11 within an annular chamber 21, defined by a casing 22 surrounding the shaft and sealed in gas tight relation to the housing 12. The casing 22 includes a stator wall 23 having a radial sealing surface 24 facing the direction of gas pressure and which cooperates with a radial sealing surface 25, formed on the rotor 20. The surfaces 24, 25 are preferably lapped flat and smooth within a few millionths of an inch, so that when the surfaces are in contact, gas under pressure is unable to pass between the surfaces and through the seal 10.

In the embodiment shown in FIG. 1, the casing 22 is provided with a depending wall 26 which cooperates with the stator wall 23 in defining the annular chamber 21. To facilitate the mounting of the rotor 20 on the shaft 11, the rotor is preferably fitted onto a sleeve 27 which is sealed about the shaft. In this way, the outer cylindrical surface of the sleeve can be easily lap finished to form a sealing surface adapted to cooperate with the inner cylindrical surface of the rotor 20. It will be understood that the rotor can be fitted directly onto a suitably finished portion of the rotatable shaft without utilizing an intermediate sleeve, if desired.

Pursuant to the invention, the rotor 20 and the sleeve 27 are formed of materials having different thermal coefficients of expansion, so that at ordinary temperatures the rotor is free to slide on the sleeve, but when the extreme operating temperatures are reached, the rotor becomes seized by the sleeve and locked tightly thereon. For example, when the seal 10 is intended to contain gas at temperatures on the order of 1,000 degrees Fahrenheit, the rotor 20 may be formed of carbon having a thermal expansion coefficient of $1.5 \times 10^{-6}$ inches per degree F., while the sleeve 27 is formed of steel having a thermal expansion coefficient of $10.5 \times 10^{-6}$ inches per degree F.

To prevent disintegration of the carbon rotor at high r.p.m.'s, a retaining ring 28, formed of high tensile strength steel, is tightly fitted about the periphery of the rotor 20, so as to resist the tendency of the frangible rotor 20 to fly apart.

In accordance with the present invention, an annular wave spring 30 is disposed adjacent the rotor 20 so as to bias the rotor sealing surface 25 against the stator wall sealing surface 24 when the shaft 11 is at rest and so arranged that after the shaft, rotor and spring reach their operating speed, the wave spring 30 will be ineffective to bias the rotor because of the inherent centrifugal expansion and resulting flattening of the spring. In this way, the spring 30 is effective to maintain the sealing surfaces 24, 25 in sealing engagement when the shaft is at rest, but the spring is ineffective to produce rubbing contact between the rotor and stator wall when the seal is in high speed operation. In the embodiment illustrated in FIG. 1, the spring 30 is compressed between the rotor 20 and a flange 31 formed of the sleeve 27. An overhanging projection 32 on the rotor 20 serves to keep the spring 30 in approximately axial alignment with the remaining parts of the seal 10. It will be appreciated that the projection 32 cannot surround the spring 30 too closely, since it must allow sufficient room for the spring to expand when it is rapidly rotated.

Turning in greater detail to the spring 30, an effective spring has been formed, in a practical case, from .005–.006" thick stainless steel or beryllium copper formed into an annular strip 3/32" wide and having three, peripherally spaced, undulations set approximately 1/8" from the plane of the material. It will be appreciated that when a flat annular ring is undulated to form the wave spring 30, the undulations cause an appreciable decrease in the circumference of the ring. The outside diameter of the exemplary wave spring described above is thus approximately 1/32" less than the diameter of the flat ring from which it was formed.

When the above described exemplary spring is installed, it is compressed axially to a "thickness" of approximately 1/16", and this substantial compression causes the spring to exert a strong force urging the rotor and stator wall sealing surfaces into engagement. Under operating conditions, when the wave spring is rapidly rotated about its axis, centrifugal force will urge the material in the ring outwardly and the spring will expand toward its original ring diameter. As a result of this centrifugal expansion, the spring "flattens" and its axially exerted force is substantially reduced. Preferably, the intial compression of the spring is sufficient to prevent the rapidly rotated and thus flattened spring from becoming "loose" and vibrating at high speeds. In the example being discussed, therefore, the spring does not "flatten" below 1/16". It can be seen, however, that while the spring 30 will strongly bias the rotor 20 as long as the shaft 11 is at rest, when the shaft, rotor and spring reach their high normal operating speed, the spring 30 will no longer exert an appreciable force on the rotor, and the latter therefore will function as an unbiased floating rotor.

To understand how the present invention effects a positive, high pressure seal under static or stand-by conditions, as well as during high speed, high temperature operation, it will be helpful to trace the sequence of events as they are understood to occur in a typical seal 10 installed in a gas turbine. The rotary seal of the present invention is said to be of a "floating" type since the rotor 26 is free to slide or "float" on the sleeve 27 under static, non-operating conditions. To permit the rotor to slide on the sleeve, the inner diameter of the rotor is about 0.0003" greater than the outer diameter of the sleeve 27. When the shaft 11 is at rest, therefore, the spring 30 is effective to bias the rotor toward the left so that the surfaces 24, 25 are in sealing contact.

To start the turbine, hot gas is introduced and the shaft 11 and the rotor 20 begin to rotate. As soon as operating speeds are approached, for example, 30,000–50,000 r.p.m., the rapidly rotating spring 30 expands and loses its strong axial biasing force.

As the temperature of the turbine rises, the heated steel shaft 11 and the sleeve 27 expand both radially and axially. Since the rotor is loose on the sleeve, the axial shaft expansion simply causes the shaft and sleeve to move through the rotor. Because the shaft 11 is mounted in the bearing 13, the direction in which the shaft 11 expands axially through the rotor in the FIG. 1 embodiment would be toward the right.

During the final stages of expansion, as the turbine reaches operating temperatures, the rotor 20 will tend to bind on the sleeve 27, since, it will be remembered, the rotor has a lower coefficient of expansion than the shaft and sleeve. At the final operating temperature, the rotor is tightly bound in positive, sealed engagement with the sleeve and cannot slide thereon. Thus, the final bit of axial shaft expansion may carry the rotor along with the sleeve away from the stator's sealing wall 23, so that there is no longer positive engagement between the sealing surfaces 24, 25.

However, there is no tendency for the gas under pressure to escape between the separated sealing surfaces since there is a pressure build-up in the annular chamber 21 surrounding the rotor. This is caused by the gas within the narrow confines of the chamber coming unavoidably into contact with the whirling rotor which acts to fling the gas molecules outwardly, operating much like a centrifugal pump. A region of pressure is thus built up within the annular chamber 21 which is greater than the pressure on either side of the rotor. The gas molecules forming this region of pressure cannot escape along the rotor due to its pumplike action, and the pressure region forms a block which acts to prevent the gas in the housing from escaping. Thus, there is produced an effective positive seal during normal turbine operation.

When the turbine is stopped by shutting off the supply of hot gas, the shaft rotation slows down and the temperature drops. The cooling shaft and sleeve contract and the rotor 20 is again free to slide on the sleeve 27, but the still high speed of rotation tends to keep the spring 30 flattened so that the rotor is not strongly biased into rubbing and wearing contact with the stator wall 23. Finally, as the parts slow down and come to rest, the wave spring 30 is again effective to exert an effective biasing force on the rotor 20 urging it to the left in FIG. 1 and bringing the surfaces 24, 25 into sealing contact.

The spring 30 thus assures that when the parts are at rest, the sealing surfaces 24, 25 are in contact to prevent a blast of hot gas from leaking between the rotor and the stator wall when the turbine is again started and before it reaches operating speed and temperature. Thus, it can be appreciated that the seal of the present invention provides an effective seal under both static, non-operating conditions and at high speeds and temperatures.

Turning next to the embodiment of the invention shown in FIG. 2, it will be observed that elements and parts similar to those discussed above have been given the same identifying numerals with the distinguishing suffixes "a" or "b" added. In this embodiment, a pair of rotors 20a, 20b, are slidably mounted on a sleeve 27a, adapted to be fixed on a rotatable shaft. The rotors 20a, 20b, are disposed within an annular chamber 21a, defined by a pair of opposed stator walls 23a, 23b, separated by a spacer ring 40, with the entire assembly of stator walls and spacer ring being secured within a seal casing 22a. In this embodiment, the rotor 20a and the stator wall 23a, and the rotor 20b and the stator wall 23b, have opposed cooperating sealing surfaces, and a wave spring 30a is disposed between the two rotors so as to urge their respective sealing surfaces into contact with the opposed stator wall sealing surfaces.

As a feature of the invention, a pair of rings 41, 42, having inter-engaging portions 43, are tightly fitted about the outer peripheries of the rotors 20a, 20b, respectively. This reinforces the frangible rotors 20a, 20b, and causes them to rotate in unison while permitting them to slide relative to one another on the sleeve 27a. The inter-engaging portions 43 on the rings 41, 42, have mutually contacting surfaces 44 which are axially aligned with the rings. It can therefore be seen that the rings will freely slide axially relative to one another, but will be constrained to rotate about their mutual axis as a single unit. Thus, although the rings both tightly surround their respective rotors so as to resist the tendency of the rotors to disintegrate under high centrifugal forces and also cause the rotors to rotate as a unit, the rings do not restrict sliding movement of the rotors on the sleeve 27a.

It will also be observed that the rings 41, 42 perform an additional function in that they retain the wave spring 30a and keep it generally axially aligned with respect to the remaining structure of the seal 10a.

In operation, it will be understood that the seal 10a functions in substantially the same manner as seal 10 described above. Thus, when the seal 10a is in a static, non-operating position, the wave spring 30a will strongly urge the rotors 20a, 20b into sealing engagement with the stator walls 23a, 23b, respectively.

When the shaft upon which the sleeve 27a is rotated and brought up to normal high operating speeds, the resulting centrifugal force causes the wave spring 30a to expand and flatten so as to substantially reduce its axial biasing forces on the rotors 20a, 20b. The rotors are therefore free to float within the annular chamber 21a and they function in the manner described above to develop a region of high gas pressure within the chamber that is effective to prevent leakage through the seal under high speed, extreme temperature conditions. When rotation of the seal parts slows down, the spring 30a again becomes effective to urge the rotors into sealing contact with their respective stator walls and an effective static or stand-by sealing condition is re-established.

It will be noted that the seals 10, 10a, use no O-rings formed of similar organic materials to provide an effective sealing action under all conditions. Therefore, the seal of the present invention is not limited to operating at low temperatures, but is effective at temperature ranges up to 1500 degrees Fahrenheit.

I claim as my invention:

1. For use with a gas pressure maintaining housing having a rotatable shaft passing through an opening therein, a rotary seal for preventing gas leakage through said opening along said shaft under both static and high speed extreme temperature conditions, comprising, in combination, an annular casing surrounding said shaft and being sealed in gastight relation to said housing, said casing having a pair of spaced radial walls with opposed sealing surfaces respectively, said casing and walls defining an annular chamber opening only inwardly toward said shaft, a pair of annular rotors disposed adjacent one another within said chamber and each rotor being fitted on a portion of said shaft for free sliding movement relative to said walls, said rotors being formed of a frangible material, a pair of rings, each ring tightly surrounding the outer periphery of one of said rotors so as to strengthen and prevent break-up of said frangible material, said rings having mutually interengaging portions causing said rotors to rotate in unison while permitting them to slide relative to one another, and an annular wave spring disposed between said rotors and within said ring interengaging portions so as to urge the rotors apart into sealing engagement with the respective wall sealing surfaces when the shaft is at rest, said wave spring being unable to effectively urge the rotors when the shaft, rotors, rings and spring reach their operating speed because of the centrifugal expansion and resulting flattening of the spring.

2. The method of preventing gas leakage through a housing along a rotatable shaft passing through an opening in said housing under both static and high speed, extreme temperature conditions, comprising, in combination, sealing an annular casing which surrounds said shaft in gas-tight relation to said housing, said casing having a first radial wall with a sealing surface facing the direction of gas pressure and a second wall spaced from said first wall, said casing and walls defining an annular chamber opening inwardly toward said shaft, slidably fitting a rotor on a portion of said shaft within said chamber under said static condition so that the rotor is shiftable on the shaft portion and a sealing surface on said rotor faces said first wall sealing surface, disposing an annular wave spring about said shaft portion and adjacent said rotor so as to bias the rotor sealing surface against the first wall sealing surface under static conditions, rotating said shaft at said high speed so as to substantially reduce said spring bias by centrifugally expanding and flattening said spring, said rotor and said shaft portion having different thermal coefficients of expansion, and bringing said rotor and shaft portion to said extreme temperature so as to seize the rotor on the shaft portion due to the unequal thermal expansion of the rotor and shaft portion.

References Cited in the file of this patent

UNITED STATES PATENTS

| | | |
|---|---|---|
| 1,033,237 | De Ferranti | July 23, 1912 |
| 2,433,839 | Ferguson et al. | Jan. 6, 1948 |
| 2,479,711 | Arutunoff | Aug. 23, 1949 |
| 2,543,615 | Trumpler | Feb. 27, 1951 |
| 2,639,171 | Johnson | May 19, 1953 |